3,531,445
PROCESS FOR HYDROGENATING POLYMERS
Toshio Yoshimoto, Seiya Kaneko, Hiroshi Yoshii, and Takashi Sasaki, Tokyo, Japan, assignors to Bridgestone Tire Company Limited, Tokyo, Japan
No Drawing. Filed Apr. 15, 1969, Ser. No. 816,406
Claims priority, application Japan, Apr. 23, 1968, 43/26,925
Int. Cl. C08f 27/25
U.S. Cl. 260—80.7     24 Claims

ABSTRACT OF THE DISCLOSURE

A new catalyst for hydrogenation of a polymer having hydrogenatable unsaturated bonds in a viscous solution form with hydrogen is prepared by mixing under an inert atmosphere (1) At least one hydrocarbon polymer having at least 5 mole percent of carbon-carbon double bonds, (2) At least one organic compound selected from the group consisting of a metal carboxylate and a metal chelate compound, in which chelating groups are attached to the metal through a pair of two oxygen atoms, said metal being selected from the group consisting of nickel, cobalt and iron and (3) At least one metal compound reducing agent having the formula $$M'R'_{n'}$$

wherein M' is a metal selected from the group consisting of lithium, magnesium and aluminium, R' is a member selected from the group consisting of a hydrocarbon radical having from 1 to 12 carbon atoms and an alkoxy radical having from 1 to 12 carbon atoms and n' is a valence number of M', the molar ratio of said organic compound to the carbon-carbon double bonds of said hydrocarbon polymer being from 1:0.1 to 1:50.

---

The present invention relates to a new hydrogenation catalyst consisting of three catalytic components and a process for hydrogenating polymers by the use of said catalyst.

In order to hydrogenate polymers having hydrogenatable unsaturated bonds efficiently by the use of ordinary heterogeneous catalysts of reduced metals such as Raney nickel and nickel kieselguhr, it has been necessary to use a large amount of catalysts, a high reaction temperature of from 150° to 200° C. or higher and a high hydrogen pressure, because a solution of high molecular weight polymers is more viscous than that of low molecular weight compounds. There has been a further demerit that these high temperature hydrogenation conditions cause the degradation of the polymeric chains. Further, these heterogeneous catalysts are not suitable for hydrogenation of the polymers, because they are easily poisoned by impurities which are difficult to be removed from and also it is very difficult to remove such a heterogeneous catalyst residue from the hydrogenated polymers after hydrogenation.

It is an object of the invention, therefore, to remove above mentioned demerits and to provide a new stable catalyst with high activity suitable for the hydrogenation of polymers in a viscous solution form.

Another object of the invention is to provide a new process suitable for hydrogenating polymers in a viscous solution form.

A further object of the invention is to provide new hydrogenated polymers suitable for manufacturing the rubber articles.

Other and further objects of the invention will become apparent to those skilled in the art upon consideration of the accompanying disclosure.

The applicants had proposed that a mixture of (1) a low molecular weight olefin or acetylene compound, (2) an organic compound of a transition metal such as nickel, cobalt and iron and (3) a metal compound reducing agent such as a trialkylaluminium provides another type of a hydrogenation catalyst, namely a three component hydrogenation catalyst with high activity and stability. After the elaborate investigation of the function of an olefin or an acetylene compound, the inventors have found that the selected polymers having carbon-carbon double bonds can be used instead of a low molecular weight olefin or acetylene compound and have accomplished the present invention. The hydrogenation catalyst prepared from the selected polymers has various merits as described hereinafter, which had never been obtained from an olefin or an acetylene compound.

The present invention provides a process for catalytic hydrogenation of a polymer, which comprises reacting a polymer having hydrogenatable unsaturated bonds in a viscous solution form with hydrogen by the use of a three component pre-prepared catalyst prepared by mixing under an inert atmosphere.

(1) At least one hydrocarbon polymer having at least 5 mole percent of carbon-carbon double bonds, (2) At least one organic compound selected from the group consisting of a metal carboxylate and a metal chelate compound, in which chelating groups are attached to the metal through a pair of two oxygen atoms, said metal being selected from the group consisting of nickel, cobalt and iron and (3) At least one metal compound reducing agent having the formula $$M'R'_{n'}$$

wherein M' is a metal selected from the group consisting of lithium, magnesium and aluminium, R' is a member selected from the group consisting of a hydrocarbon radical having from 1 to 12 carbon atoms and an alkoxy radical having from 1 to 12 carbon atoms and n' is a valence number of M', the molar ratio of said organic compound to the carbon-carbon double bonds of said hydrocarbon polymer being from 1:0.1 to 1:50.

According to the present invention, the hydrogenation of polymers in a highly viscous solution form can be effected at a very high rate which has never been obtained. Especially, the olefinically unsaturated bonds of polymers can be hydrogenated under mild conditions such as at near room temperature and under low hydrogen pressure and therefore the process of the present invention can be utilized advantageously in the selective hydrogenation of the olefinically unsaturated bonds. Furthermore, as the catalyst of the present invention is very stable, the process can also be used advantageously in the continuous hydrogenation process.

The first component of the catalyst of the present invention is a hydrocarbon polymer having at least 5 mole percent of carbon-carbon double bonds. As the hydrocarbon polymer having less than 5 mole percent of carbon-carbon double bonds does not form the active hydrogenation catalyst, it is not used in the present invention. A hydrocarbon polymer having butadiene units and/or isoprene units is preferably used. Examples of the polymer include polybutadiene, polyisoprene, butadiene-isoprene copolymer, butadiene-styrene copolymer, isoprene-styrene copolymer, ethylene-butadiene copolymer, ethylene-isoprene copolymer, copolymer of butadiene and/or isoprene with another monomer copolymerizable with butadiene and/or isoprene and the like. Further, terpolymer of ethylene, propylene and diolefin copolymerizable with ethylene and propylene may be used. Examples include ethylene-propylene-1,7-octadiene terpolymer, ethylene - propylene - dicyclopentadiene terpolymer, ethylene-propylene-ethylidenenorbornene terpolymer and the like. Still further, homopolymer of the diolefin such as hexadiene, octadiene and cyclooctadiene and copolymer of the diolefin with another monomer copolymerizable with the diolefin may be used. Polymers having halogen, cyano radicals or other bonds such as polychloroprene, butadiene-acrylonitrile copolymer and copolymer of propylene-oxide with another diolefin are not used as the catalytic component of the present invention even if they have carbon-carbon double bonds such as butadiene units and isoprene units, because they do not form active hydrogenation catalyst. The above mentioned first component of the catalyst of the present invention is usually solid and therefore it is used in the solution of an inert hydrocarbon, but liquid oligomer may also be used.

The second component of the catalyst of the present invention is the organic compound of nickel, cobalt or iron. The organic compounds of which organic radicals are attached to the metal through oxygen and which is soluble in the inert solvent, may be used. Among those, one of preferable compounds is a metal carboxylate having the formula $(RCOO)_nM$, wherein M is a metal selected from the group consisting of nickel, cobalt and iron, R is a hydrocarbon radical having 1 to 50 carbon atoms, preferably from 5 to 30 carbon atoms and $n$ is a valence number of M. These metal carboxylates include nickel, cobalt or iron salts of hydrocarbon aliphatic acid, hydrocarbon aromatic acid and hydrocarbon cycloaliphatic acid. Examples of hydrocarbon aliphatic acids include a hexanoic acid, a heptanoic acid, an octanoic acid, a nonanoic acid, a decanoic acid, a dodecanoic acid, a myristic acid, a palmitic acid, a stearic acid, a dodecenoic acid, an oleic acid, a linoleic acid, a rhodinic acid and the like. Examples of hydrocarbon aromatic acids include benzoic acid and alkyl-substituted aromatic acids in which alkyl has from 1 to 20 carbon atoms. These include t-butyl, 2-ethylhexyl-, dodecyl-, and nonylbenzoic acids and the like. Examples of cycloaliphatic acids include naphthenic acid, cyclohexylcarboxylic acid, abietic type resin acid and the like. Commercially available metallic soaps such as naphthenic acid salts, rosin acid salts, linoleic acid salts, oleic acid salts, stearic acid salts and tall oil salts may be used.

Other preferable organic compounds are metal chelate compounds, in which the chelating groups are attached to nickel, cobalt or iron through a pair of two oxygen atoms. As the chelating groups, $\beta$-ketones, $\alpha$-hydroxycarboxylic acids, $\beta$ - hydroxycarboxylic acids and $\beta$-hydroxycarbonyl compounds may be used. Examples of the $\beta$-ketones include acetylacetone, 1,3-hexane-dione, 3,5-nonadione, methyl acetoacetate, ethyl acetoacetate and the like. Examples of the $\alpha$-hydroxycarboxylic acids include lactic acid, glycolic acid, $\alpha$-hydroxyphenylacetic acid, $\alpha$-hydroxy-$\alpha$ - phenylacetic acid, $\alpha$ - hydroxycyclohexylacetic acid and the like. Examples of the $\beta$-hydroxycarboxylic acids include salicylic acid, alkyl-substituted salicyclic acid, and the like. Examples of the $\beta$-hydroxycarbonyl compounds include salicylaldehyde, o-hydroxyacetophenone and the like. Examples of the metal chelate compounds having above described chelating groups include bis(acetylacetone)nickel, tris(acetylacetone)cobalt, tris(acetylacetone)iron, bis(ethyl acetoacetate)nickel, bis (ethyl acetoacetate)cobalt, bis(3,5 - diisopropylsalicylic acid)nickel, bis(salicylaldehyde)nickel, bis(salicylaldehyde)cobalt and the like.

The third component of the catalyst of the present invention is a metal compound reducing agent.

An organometallic compound or a hydride of the metal of Group 1, 2 or 3 of Periodic Table may be used. The organometallic compounds having the formula of $M'R'_{n'}$, wherein M' is a metal selected from the group consisting of lithium, magnesium and aluminium, R' is selected from the group consisting of hydrocarbon radical having from 1 to 12 carbon atoms, hydrogen and an alkoxy radical having from 1 to 12 carbon atoms and $n'$ is the valence number of M', are preferably used.

The hydrocarbon radical includes an alkyl, aryl, alkaryl, aralkyl and cycloaliphatic group. Examples of such radicals include methyl, ethyl, n-propyl, i-propyl, n-butyl, i-butyl, sec-butyl, t-butyl, pentyl, hexyl, heptyl, octyl, nonyl, decyl, dodecyl, phenyl, benzyl, tolyl, cyclopentyl, cyclohexyl, cyclohexenyl and naphthyl radicals. The group combined to oxygen in the alkoxy radical is exemplified as described above too.

Examples of such organometallic compounds include ethyllithium, n - propyllithium, n - butyllithium, i - butyllithium, sec-butyllithium, t-butyllithium, n-pentyllithium, phenyllithium, diethylmagnesium, di-n-propylmagnesium, di-n-butylmagnesium, diphenylmagnesium, triethylaluminium, tri-n-propylaluminium, triisopropylaluminium, tri-n - butylaluminium, triisobutylaluminium, triamylaluminium, trihexylaluminium, trioctylaluminium, tridodecylaluminium, diethylisobutylaluminium, diethyloctylaluminium, tricyclohexylaluminium, triphenylaluminium, didodecylaluminiumhydride, diisobutylaluminiumhydride, diethylaluminiumethoxide, dibutylaluminiumbutoxide and their mixtures. Among them, a trialkylaluminium is more preferably used. In addition to the above mentioned compounds, the organometallic compounds and the metal hydrides having two kinds of metals such as lithiumaluminiumtetrabutyl, lithiumaluminiumhydride and sodiumborohydride may be used.

The catalyst of the present invention is prepared prior to hydrogenation by mixing above mentioned three catalytic components under an inert atmosphere and in an inert solvent. As the inert atmosphere, nitrogen, helium or argon atmosphere are preferably used and hydrogen is not suitable. As the inert solvent, an aliphatic hydrocarbon, an aromatic hydrocarbon or a cycloaliphatic hydrocarbon is preferably used. Halogen substitutes of above described hydrocarbon or ether may also be used, but the catalyst with low activity forms in these solvents. Usually, dehydrated hexane, heptane, octane, benzene, toluene, xylene, cyclohexane, Decalin, tetralin and the like are more preferably used. These inert solvents may also be used in order to dissolve polymers to be hydrogenated.

The reaction product obtained by mixing the second catalytic component with the third catalytic component of the present invention in the absence of the first catalytic component may be used as a hydrogenation catalyst, but the reaction product is unstable and it must be used immediately after mixing, otherwise a hydrogenation catalyst having a high activity cannot be obtained. Further, the activity of the two component hydrogenation catalyst is usually inferior to that of the three component catalyst of the present invention. This tendency becomes more conspicuous when the catalyst is prepared at a high temperature of about 80° C. Namely, when the reaction product, which had been prepared by mixing the second catalytic component with the third catalytic component in the presence of the first catalytic component of the present invention, is heated at a high temperature under an inert atmosphere for as long as one or two hours, the activity of the hydrogenation catalyst is almost the same as that used as soon as possible after preparation or does not substantially decrease. On the contrary, the activity of the two component catalyst prepared by mixing the second catalytic component with the third catalytic component in the absence of the first catalytic component decreases rapidly with time after preparation. For example, the reaction product obtained by mixing nickel naphthenate with triethylaluminium in toluene at 80° C. had too low an activity to be used as the hydrogenation catalyst after 1 hour. Further, low molecular weight compounds having olefinically or acetylenically unsaturated bonds may be used instead of the first catalytic component of the present invention, but the catalyst prepared from the low molecular weight olefin or acetylene compound is more unstable than the catalyst of the present invention.

In the continuous hydrogenation process, it is possible to introduce the pre-prepared polymer solution into the reactor continuously, to mix the pre-prepared catalyst obtained by mixing the catalystic components with the polymer solution continuously, to contact the polymer solution containing the resulting catalyst with hydrogen in the reactor continuously and to take out the hydrogenated polymer solution from the reactor continuously. It is, therefore, preferable that activity of the catalyst once obtained by mixing the catalytic components is stable and does not decrease with time. Therefore, the catalyst of the present invention which is stable for a long time is suitable for a continuous hydrogenation process. Such merit makes the present invention more valuable, especially when used industrially.

Further, when the low molecular weight olefin compound is used as the catalytic component, the obtained hydrogenated polymer often contains the olefin compound as the catalyst residue. Such catalyst residue often swells undesirably and is preferably removed if possible. According to the present invention, when the polymer to be hydrogenated is used as the catalytic component at the same time, the obtained hydrogenated polymer is never contaminated by the undesirable catalyst residue and merely contains no hydrogenated polymer prior to hydrogenation at the worst.

The mixing order of three catalytic components of the present invention is very important to obtain the catalyst with the highest activity. When the catalyst is prepared at a temperature of from 0° to 100° C., the second catalytic component is preferably mixed with the third catalytic component in the presence of the first catalytic component. Furthermore, when the catalyst preparation is carried out below 0° C., the second and the third catalytic components may be mixed and thereafter the first catalytic component may be added to the obtained mixtures. The catalyst prepared by this procedure is also stable when heated after preparation at a high temperature of about 80° C. On the other hand, when the first catalytic component is added to the reaction mixtures obtained by mixing the second catalytic component with the third catalytic component at a temperature of from 0° to 100° C., the catalyst with a low activity often forms. The fact that the stable catalyst can be obtained when the catalyst preparation is effected even at a high temperature in the former process shows that the first catalytic component is not merely an additive but an essential component to the catalysts of the present invention.

The molar ratios of the second catalytic component to the third catalytic component may be varied widely. The molar ratio of the second catalytic component to the third catalytic component of from 1:0.1 to 1:20 is preferably used. More preferably, the ratio of 1:0.2 to 1:10 is used. Most preferably, the ratio of 1:0.2 to 1:8 is used. The molar ratio of the second component to the carbon-carbon, double bond of the first component from 1:0.1 to 1:50 is preferably used. More preferably, the ratio of from 1:0.2 to 1:20 is used. When the molar ratio of the carbon-carbon double bonds of the first component to the second component is 1:more than 50, this case corresponds to the case when the second component is mixed with the third component in the polymer solution to be hydrogenated, the formation of the hydrogenation catalyst requires a long time and the induction period is observed at the beginning of the hydrogenation reaction and therefore such molar ratio is not preferable. On the contrary, the hydrogenation reaction proceeds instantly when the catalyst of the present invention is mixed with the polymer solution to be hydrogenated and the control of the hydrogenation reaction, especially the degree of hydrogenation, is easy. Therefore, the catalyst of the present invention is used advantageously in the continuous hydrogenation process.

The catalyst of the present invention is used for the hydrogenation of the unsaturated bonds of polymers in a viscous solution form. The hydrogenatable unsaturated bonds according to the present invention include carbon-carbon double bond, carbon-carbon triple bond and carbon-nitrogen triple bond. Diene polymers having such hydrogenatable unsaturated bonds are preferably employed in the present invention. Such diene polymers include homopolymer and copolymer of conjugated diene, and copolymer of conjugated diene and unsaturated compound which can copolymerize with conjugated diene such as vinyl substituted aromatic hydrocarbon. Examples of such polymers include polybutadiene, polyisoprene, butadiene-styrene copolymer, butadiene-α-methylstyrene copolymer, butadiene-isoprene copolymer, polybutadiene grafted with a minor amount of styrene, butadiene-acrylonitrile copolymer, butadienevinylpyridine copolymer and others. The polymers obtained from butadiene are preferably used, because hydrogenation of butadienic units proceeds under mild conditions. These polymers may be prepared by bulk polymerization, solution polymerization or emulsion polymerization by the use of radical type initiator, ionic type initiator or Ziegler type initiator. The polymers having Mooney Viscosity at 100° C. of more than 20 can be easily hydrogenated according to the present invention. The hydrogenated polymers obtained from the polymers of such high Mooney Viscosity are useful for manufacturing rubber articles and therefore the polymers having Mooney Viscosity at 100° C. of preferably more than 20, more preferably more than 40, are hydrogenated according to the present invention.

The catalyst of the present invention has so high activity for the hydrogenation of olefinically unsaturated bonds of polymers that the complete hydrogenation can be carried out under the mild condition such as atmospheric pressure of hydrogen and near room temperature in a short time. Further, the aromatic nuclei can be hydrogenated under more severe conditions, i.e. under high hydrogen pressure and at high hydrogenation temperature.

The pressure of hydrogen used in the hydrogenation may be varied widely. Usually, the pressure of less than 50 atms. is sufficient to carry out the hydrogenation at fast rate, but the selective hydrogenation of olefinically unsaturated bonds can be carried out at a temperature of from 0° to 120° C. and under a hydrogen pressure of less than 10 atms. It is one of merits of the present invention that the selective hydrogenation of the unsaturated bonds of polymers proceeds easily in a viscous solution form in a high activity.

According to the invention, the concentration of the polymers to be hydrogenated in a solution may be varied from 1 to 30 weight percent, preferably from 1 to 25 weight percent. The viscosity of the polymer solution may be varied widely. From 0.05 to 5,000 poises, preferably from 1 to 2,000 poises, may be employed. It is one of merits of the present invention to be able to hydrogenate the solution of the polymer having such high viscosity.

After hydrogenation, removal of solvent and catalysts from the hydrogenated polymers is easily carried out by adding polar solvent such as acetone and alcohol to the reaction mixture and precipitating the polymers, or pouring the reaction products into a steam or a hot water and removing solvent by azeotropic distillation. In these procedures, catalysts are decomposed and the major part of them is removed from the polymers, but the most effective removal of the catalysts is attained by contacting the reaction mixture with polar solvent or water containing a small amount of acid.

According to the present invention, polymers of high Mooney Viscosity of even more than 40 can be easily hydrogenated under the mild condition wherein side reaction such as thermal degradation or gelation does not occur, and so the obtained polymers have no inferior properties resulted from the decrease of molecular weight or gel. For example, the hydrogenated styrene-butadiene random copolymer has higher green strength, resilience, oil extendability and heat resistance than the starting styrene-butadiene copolymer. Furthermore, this hydrogenated polymer can be processed by a roll or an extruder and compounded with a large amount of filler. The hydrogenated polybutadiene obtained by the process of the invention has an improved green strength, a low cold flow property and others.

These hydrogenated polymers of the present invention are easily curable by the conventional procedure and may be applied to the production of rubber articles.

signed to $-(CH_2)_4-$ and $-CH_3$ of hydrogenated butadiene units respectively, peaks at 967 cm.$^{-1}$ and 910 cm.$^{-1}$ assigned to trans-1,4-configuration and vinyl radical of butadiene units respectively and peaks at 699 cm.$^{-1}$ and 757 cm.$^{-1}$ assigned to phenyl radical of styrene units, and no peaks in the range of from 820 to 900 cm.$^{-1}$ assigned to cyclohexyl radical. These facts show that the selective hydrogenation of butadiene units of the polymer was carried out.

The conditions of preparation of the catalyst and the degree of hydrogenation measured by Kemp-Wijs method (A. R. Kemp, H. Peters: Ind. Eng. Chem., 15, 453–459 (1943)) are shown in the following Table 1. The degree of hydrogenation means percentage of the hydrogenated butadiene units per the butadiene units contained in the polymer to be hydrogenated.

TABLE 1

| Number | First component | Carbon-carbon double bonds/nickel (molar ratio) | Time of mixing the catalytic components (min.) | Degree of hydrogenation (percent) |
| --- | --- | --- | --- | --- |
| 1 | Polybutadiene [1] | 1 | 10 | 18.5 |
|   |   |   | 60 | 13.0 |
| 2 | do | 2 | 10 | 88.7 |
|   |   |   | 30 | 90.0 |
| 3 | do | 1 | 60 | 85.5 |
|   | Dicyclopentadiene | 1 | 60 | 78.0 |
| 4 | Styrene-butadiene random copolymer [2] | 1 | 10 | 92.5 |
| 5 | Ethylene-propylene-dicyclopentadiene terpolymer | 2 | 60 | 65.5 |
| 6 | Cis-1,4-polyisoprene [3] | 2 | 30 | 62.5 |
| 7 | Cis-1,4-polybutadiene [4] | 1 | 60 | 75.0 |

[1] Cis-1,4-configuration=35%, trans-1,4-configuration=55%, 1,2-configuration=10%.
[2] Styrene/butadiene=18/82.
[3] Cis-1,4-configuration=92%, trans-1,4-configuration=3%, 3,4-configuration=5%.
[4] Cis-1,4-configuration=96.2%, trans-1,4-configuration=2.8%, 1,2-configuration=1%.

The invention is illustrated in the greater detail in the following examples which are not intended, however, to be unduly limitative of the invention.

EXAMPLE 1

In a shakeable glass reactor of 300 ml. capacity, 100 ml. of 5 weight percent toluene solution of solution-polymerized styrene-butadiene random copolymer (styrene/butadiene=18/82, ML-4 at 100° C.:45) was placed. After the atmosphere of the reactor was replaced by hydrogen, the catalyst prepared in the following manner was added to the polymer solution and then the atmospheric pressure of hydrogen was contacted with the solution under shaking at 50° C. and an amount of hydrogen absorbed was measured continuously by gas burette.

The catalyst was prepared by mixing 0.6 mmol of nickel naphthenate with 1.8 mmol of triethylaluminium at 50° C. under nitrogen in the presence of 0.6 or 1.2 mmol of carbon-carbon double bond of hydrocarbon polymer. After pre-determined time, the catalyst solution containing 0.4 mmol of nickel was weighed out from the catalyst solution obtained by the above described procedure and then mixed with the polymer solution. In order to compare with the above catalyst of the present invention, the catalysts were also prepared by mixing nickel naphthenate with triethylaluminium in the absence of polymer having carbon-carbon double bonds or in the presence of dicyclopentadiene.

When the catalyst of the present invention was used, it was observed that hydrogen was absorbed rapidly as soon as the catalyst was mixed with the polymer solution. After 1 hour, the introduction of hydrogen was stopped and under stirring a small amount of acetone containing hydrochloric acid was added to the polymer solution and then the solution was mixed with a large amount of acetone to precipitate the hydrogenated polymer. White, rubbery hydrogenated polymer having a high tensile strength was obtained after drying under a reduced pressure.

The infrared spectrum of the obtained hydrogenated polymers shows peaks at 721 cm.$^{-1}$ and 1,380 cm.$^{-1}$ as-

EXAMPLE 2

The same hydrogenation as Example 1 was carried out by the use of the different catalyst. The catalyst was prepared by mixing 0.6 mmol of nickel 2-ethylhexanoate with 1.8 mmol of n-butyllithium at 50° C. in toluene in the presence of 0.6 mmol of carbon-carbon double bonds of polybutadiene or styrene-butadiene random copolymer used in Example 1. After pre-determined time, the catalyst solution containing 0.4 mmol of nickel was weighed out. Further, the catalyst was also prepared in the absence of carbon-carbon double bonds of the polymer.

The results are shown in the following Table 2.

TABLE 2

| No. | First component | Time of mixing the catalytic components (min.) | Degree of hydrogenation (percent) |
| --- | --- | --- | --- |
| 1 | Polybutadiene | 10 | 24.0 |
|   |   | 60 | 75.5 |
| 2 | Styrene-butadiene random copolymer | 30 | 69.0 |
| 3 | do | 60 | 80.5 |

EXAMPLE 3

In the same reactor used in Example 1, 100 ml. of 3 weight percent n-hexane solution of cis-1,4-polybutadiene (cis-1,4-configuration=96.2%, trans-1,4-configuration=2.8%, 1,2-configuration=1%) was placed and the same hydrogenation as Example 1 was carried out. The catalyst was prepared by mixing 0.6 mmol of cobalt naphthenate with 1.8 mmol of triethylaluminium at 50° C. under nitrogen in the presence of 1.2 mmol of carbon-carbon double bonds of polybutadiene used in Example 1. After 10 minutes, the catalyst solution containing 0.4 mmol of cobalt was weighed out.

The hydrogenated cis-1,4-polybutadiene having a degree of hydrogenation of 73 percent was able to be obtained by the hydrogenation in 1 hour. On the contrary, a degree of hydrogenation of 15 was obtained by the catalyst prepared in the absence of carbon-carbon double bond of the polymer.

EXAMPLE 4

The same hydrogenation as Example 1 was carried out by the different catalyst. The catalyst was prepared by mixing 0.6 mmol of iron naphthenate with 1.8 mmol of triethylaluminium at 50° C. under nitrogen in the presence of 0.6 mmol of carbon-carbon double bonds of polybutadiene or styrene-butadiene random copolymer. After the predetermined time, the catalyst solution containing 0.4 mmole of iron was weighed out. The results are shown in the following Table 3.

TABLE 3

| No. | First component | Time of mixing the catalytic, components (min.) | Degree of hydrogenation (percent) |
|---|---|---|---|
| 1 | Polybutadiene | 30 | 74 |
| 2 | do | 60 | 75 |
| 3 | Styrene-butadiene random copolymer | 10 | 75 |
| 4 | do | 60 | 69 |

EXAMPLE 5

In the same reactor as used in Example 1, 100 ml. of 5 weight percent toluene solution of polybutadiene (cis-1, 4-configuration:35%, trans-1,4:55%, 1,2:10%) was placed. The hydrogenation was carried out at 60° C. for 2 hours in the same manner as shown in Example 1. The catalyst was prepared by reacting an organic compound of nickel or cobalt with a metal compound reducing agent in the presence of carbon-carbon double bonds of polybutadiene same as to be hydrogenated in toluene at 50° C. under atmosphere of nitrogen for 30 minutes. The molar ratio of the organic compound/metal compound reducing agent/carbon-carbon double bonds of polybutadiene was 1/3/2. After 30 minutes, the catalyst solution containing 0.3 mmol of nickel or cobalt was weighed out and added to the polymer solution to be hydrogenated.

The results are shown in the following Table 4.

TABLE 4

| No. | Organic compound | Metal compound reducing agent | Degree of hydrogenation (percent) |
|---|---|---|---|
| 1 | Bis(acetylacetone) nickel | Diethylmagnesium | 83.6 |
| 2 | Nickel octanoate | n-Butyllithium | 70.1 |
| 3 | Cobalt octanoate | Triethylaluminium | 74.2 |
| 4 | Nickel cyclohexylcarboxylate | do | 77.3 |
| 5 | Cobalt octanoate | n-Butyllithium | 52.9 |

EXAMPLE 6

To a reactor equipped with a strong stirrer suitable for the hydrogenation of highly viscous solution, 10 volume percent n-hexane solution of styrene-butadiene random copolymer (styrene/butadiene=25/75, number average molecular weight=$2 \times 10^5$) was introduced continuously and it was hydrogenated at 60° C. under 3.5 kg./cm.$^2$ of hydrogen, and thereafter the hydrogenated polymer solution was recovered continuously. The degree of hydrogenation was controlled by varying the residence time of the polymer solution in the reactor. The catalyst was prepared at 50° C. in toluene under atmosphere of nitrogen by mixing nickel naphthenate with triethylaluminium in the presence of carbon-carbon double bonds of the same styrene-butadiene random copolymer as to be hydrogenated, wherein the molar ratio of nickel naphthenate/triethylaluminium/carbon-carbon double bonds of styrene-butadiene random copolymer was 1/3/2. The catalyst solution was mixed with the polymer solution to be hydrogenated before the introduction of the polymer solution to the reactor. The concentration of the catalyst was 2 mmol of nickel per liter of the polymer solution.

The physical properties of the obtained hydrogenated polymer were compared with those of the starting styrene-butadiene random copolymer. The results are shown in the following Table 5.

TABLE 5

| | Styrene butadiene random copolymer | Hydrogenated styrene-butadiene random copolymer | |
|---|---|---|---|
| Degree of hydrogenation, percent | 0 | 21.0 | 30.3 |
| Compounding recipe: | | | |
| Polymer | 100 | Same | Same |
| Aromatic oil | 37.5 | Same | Same |
| Carbon black ISAF [1] | 70 | Same | Same |
| Stearic acid | 2 | Same | Same |
| Paraffin wax | 3 | Same | Same |
| Phenylisopropyl-p-phenylenediamine | 2 | Same | Same |
| Zinc oxide | 3 | Same | Same |
| Sulfur | 1.5 | Same | Same |
| Dibenzothiazyl-disulfide | 1.5 | Same | Same |
| *After cured at 145° C.×35 minutes* | | | |
| Physical properties: | | | |
| Hardness, JIS | 54 | 61 | 63 |
| Elongation, percent | 585 | 570 | 525 |
| 300% modulus, kg./cm.$^2$ | 76 | 97 | 103 |
| Tensile strength, kg./cm.$^2$ | 175 | 203 | 200 |
| Resilience, percent at— | | | |
| Room temperature | 35.4 | 42.9 | 43.2 |
| 120° C | 57.3 | 61.4 | 64.0 |
| Compression set, percent | 18.2 | 16.4 | 15.7 |
| *After 22 hours at 70° C., strain: 35%* | | | |
| Pico Abrasion Loss (cc.$\times 10^{-3}$/80 times) 60 r.p.m. 4,300g | 13.6 | 13.3 | 13.0 |

[1] Abbreviation of Intermediate Super Abrasion Furnace.

What is claimed is:

1. A process for catalytic hydrogenation of a polymer, which comprises reacting a polymer having hydrogenatable unsaturated bonds in a viscous solution form with hydrogen by the use of a three component preprepared catalyst prepared by mixing in an inert solvent under an inert atmosphere
    (1) at least one hydrocarbon polymer having at least 5 mole percent of carbon-carbon double bonds,
    (2) at least one organic compound selected from the group consisting of a metal carboxylate and a metal chelate compound, in which chelating groups are attached to the metal through a pair of two oxygen atoms, said metal being selected from the group consisting of nickel, cobalt and iron and
    (3) at least one metal compound reducing agent having the formula $$M'R'_{n'}$$

wherein M' is a metal selected from the group consisting of lithium, magnesium and aluminium, R' is a member selected from the group consisting of a hydrocarbon radical having from 1 to 12 carbon atoms and an alkoxy radical having from 1 to 12 carbon atoms and $n'$ is a valence number of M', the molar ratio of said organic compound to the carbon-carbon double bonds of said hydrocarbon polymer being from 1:0.1 to 1:50.

2. The process of claim 1, wherein the three component catalyst is prepared by mixing said organic compound and said metal compound reducing agent in the presence of said hydrocarbon polymer at a temperature of from 0° C. to 100° C.

3. The process as claimed in claim 1, wherein said metal carboxylate is a metal octanoate.

4. The process as claimed in claim 1, wherein said hydrogenation is carried out at a temperature of from 0° to 120° C.

5. The process of claim 4, wherein the said inert solvent is selected from the group consisting of
    (a) an aliphatic, aromatic or cycloaliphatic hydrocarbon;
    (b) a halogen substituted hydrocarbon under (a); and
    (c) an ether
and mixtures thereof.

6. The process of claim 5, wherein the said metal carboxylate is of the formula $$(RCOO)_n M$$

wherein
R is a hydrocarbon radical having less than 51 carbon atoms;
$n$ is an integer corresponding to the valence member of M; and
M is nickel, cobalt or iron.

7. The process of claim 6, wherein the molar ratio of said organic compound to said metal compound reducing agent is from 1:0.1 to 1:20.

8. The process of claim 7, wherein the said hydrocarbon polymer is derived from a diolefin.

9. The process as claimed in claim 8, wherein said hydrocarbon polymer having the carbon-carbon double bonds is a hydrocarbon polymer having butadiene units.

10. The process as claimed in claim 9, wherein said hydrocarbon polymer is a polybutadiene.

11. The process as claimed in claim 9, wherein said hydrocarbon polymer is a styrene-butadiene copolymer.

12. The process as claimed in claim 8, wherein said hydrocarbon polymer having the carbon-carbon double bonds is a hydrocarbon polymer having isoprene units.

13. The process as claimed in claim 12, wherein said hydrocarbon polymer is a polyisoprene.

14. The process as claimed in claim 8, wherein said hydrocarbon polymer having the carbon-carbon double bonds is a terpolymer of ethylene, propylene and diolefin.

15. The process as claimed in claim 8, wherein said metal carboxylate is a metal naphthenate.

16. The process as claimed in claim 8, wherein said metal chelate compound is bis(acetylacetone)nickel.

17. The process as claimed in claim 8, wherein said metal compound reducing agent is a trialkylaluminium.

18. The process as claimed in claim 8, wherein said metal compound reducing agent is an alkyllithium.

19. The process as claimed in claim 8, wherein said metal compound reducing agent is dialkylmagnesium.

20. The process as claimed in claim 8, wherein said hydrogenation is carried out under hydrogen pressure of less than 50 atms.

21. The process as claimed in claim 8, wherein said polymer having hydrogenatable unsaturated bonds is a diene polymer.

22. The process as claimed in claim 21, wherein said diene polymer has a Mooney Viscosity at 100° C. or more than 20.

23. The process as claimed in claim 21, wherein said diene polymer is styrene-butadiene copolymer.

24. The process as claimed in claim 21, wherein said diene polymer is polybutadiene.

References Cited

UNITED STATES PATENTS

| | | | |
|---|---|---|---|
| 2,693,461 | 11/1954 | Jones | 260—83.5 |
| 2,864,809 | 12/1958 | Jones et al. | 260—85.1 |
| 2,997,433 | 8/1961 | Short et al. | 204—162 |
| 3,205,278 | 9/1965 | Laporte | 260—667 |

FOREIGN PATENTS

| | | |
|---|---|---|
| 651,281 | 10/1964 | Belgium. |
| 658,543 | 1965 | Belgium. |
| 1,020,720 | 2/1966 | Great Britain. |

OTHER REFERENCES

Chemical Abstracts 62:6589e (1964), 63:4412g (1965).

JOSEPH L. SCHOFER, Primary Examiner

J. C. HAIGHT, Assistant Examiner

U.S. Cl. X.R.

260—80.78, 82.1, 83.3, 85.1, 88.2, 93.1, 94.7, 96